2,166,883

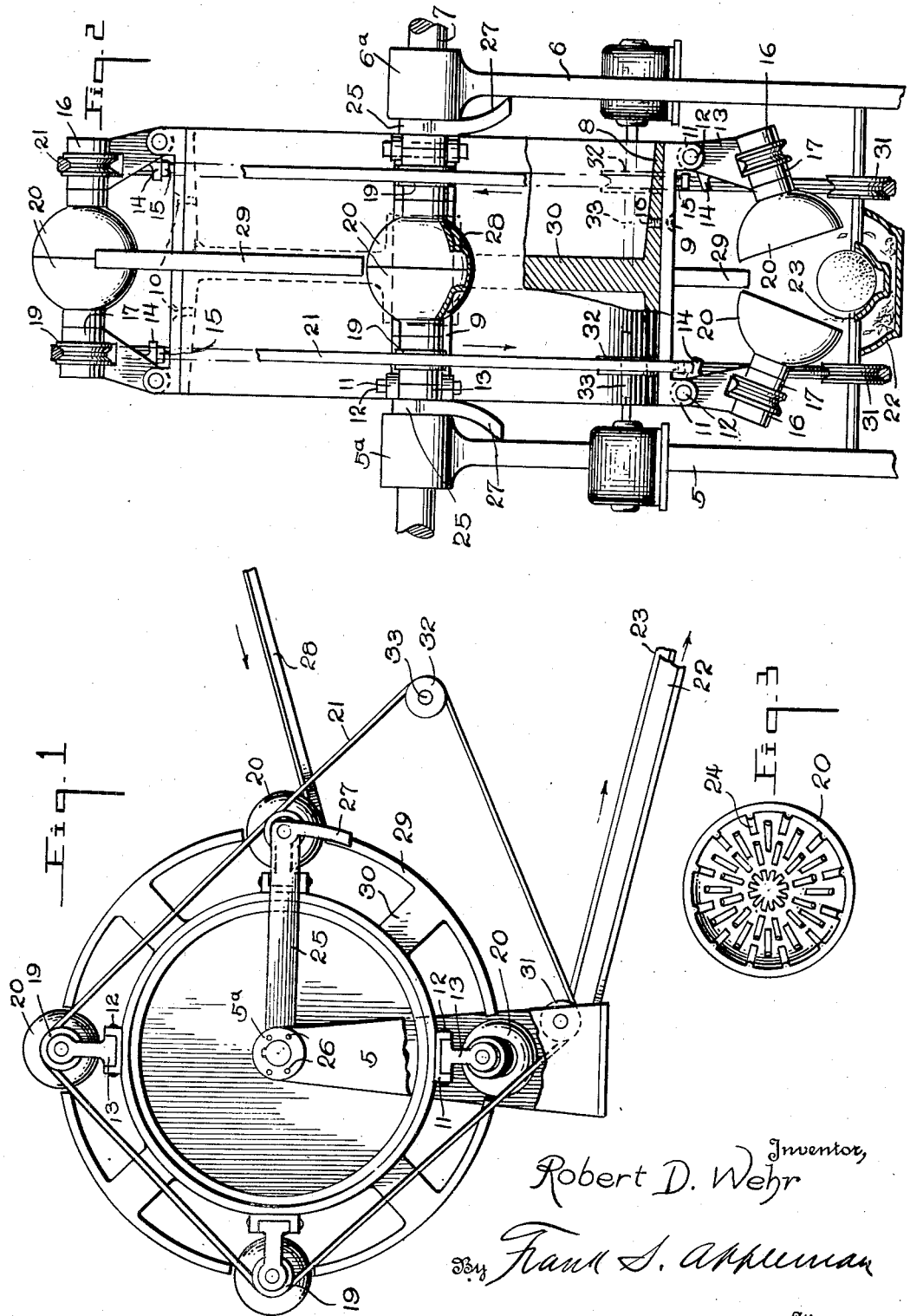
July 18, 1939. R. D. WEHR 2,166,883
CITROUS PEEL SCRAPER
Filed Jan. 31, 1938
Robert D. Wehr, Inventor,
By Frank S. Appleman
Attorney Patented July 18, 1939

UNITED STATES PATENT OFFICE 2,166,883

CITROUS PEEL SCRAPER

Robert D. Wehr, Auburndale, Fla.

Application January 31, 1938, Serial No. 187,956

4 Claims. (Cl. 146—49)

This invention relates to machines for removing the outer surfaces of skins of oranges or the like, and may be generally defined as a citrous peel scraper.

An object of the invention is to provide novel means for scraping the part of the citrous fruit containing oil, and for releasing the fruit in order that it may be delivered to a squeezer or juicer.

A further object of this invention is to provide novel means whereby a plurality of scrapers may be operated in unison and successively receive the fruit to be treated and acting to successively discharge the fruit therefrom, as stated.

It is an object of this invention furthermore to provide fruit embracing instrumentalities rotatable in opposite directions while embracing or engaging the fruit, the said instrumentalities being in the nature of cups with abrading inner surfaces which are effective to scrape the fruit; and it is furthermore an object to provide novel means whereby these instrumentalities are actuated or oscillatably mounted in pairs, the said instrumentalities being also rotatably driven during the movement in a certain zone and left inactive as to their rotation during their travel through another zone, so that when they are freed from rotation, they may separate to discharge the scrapings and the fruit therefrom and then move into cooperative relation to embrace another fruit and operate to scrape the fruit during its movement through another zone.

It is a still further object of the invention to provide novel means whereby pairs of scraping instrumentalities are automatically moved into cooperative relation with each other to embrace the fruit at a location where the fruit is delivered from a trough or chute, over which the fruit may travel; and the invention furthermore includes novel means for holding the fruit on the trough or chute during the movement of the cups when they are out of registry or alinement with the trough or chute delivering the fruit.

It is furthermore an object of the invention to provide novel means whereby the members embracing the fruit are rotated in opposite directions and in unison during the movement of the instrumentalities through the zone from the time the fruit is received until it is discharged.

With the foregoing and other objects in view, the invention consists in the details of construction, and in the arrangement and combination of parts to be hereinafter more fully set forth and claimed.

In describing the invention in detail, reference will be had to the accompanying drawing forming part of this application, wherein like characters denote corresponding parts in the several views, and in which—

Figure 1 illustrates a view in side elevation of a citrous peel scraper embodying the invention;

Figure 2 illustrates a view in front elevation, partly in section; and

Figure 3 illustrates a view in elevation of the front of one of the scraping instrumentalities or cups.

In the drawing 5 and 6 denote standards or frame members having bearings $5^a$ and $6^a$, respectively, in which a shaft 7 is rotatable and on which a pulley-like wheel 8 is mounted to rotate with the shaft. The wheel has a relatively wide face on which at predetermined positions the scrapers are mounted. Each mounting for the scrapers comprises a plate 9 which is secured to the rim of the wheel in any appropriate manner, as by screws 10, and each plate has apertured lugs 11 at its ends, in which trunnions 12 of a bracket 13 are partially rotatable, so that the brackets may oscillate from positions in which they are shown at the top of Fig. 2 to positions in which they are shown at the bottom of Fig. 2, these two positions representing respectively the scraper instrumentalities as embracing and operating on a fruit, and as releasing the fruit after it has been scraped. Each bracket has a lug 14 projecting inwardly from the side of the machine to engage an adjusting screw 15 so that all of the brackets may be set to move to positions where they are uniformly arranged. Each bracket has bearings 16 and 17 in spaced relation to each other, in which a shaft 18 is rotatable, and a groove pulley 19 is mounted on the shaft in the space between the bearings. Each shaft has a cup 20 on its inner end that rotates with the shaft and, as shown in Fig. 2, the cups coact as at the top of Fig. 2, when they are driven in opposite directions, to scrape the citrous peel. The groove pulleys are engaged by a belt 21 which is preferably of the V-shaped type, although the inventor does not wish to be limited with respect to this detail of operation.

At the bottom of the frame a relatively wide trough 22 is provided for the reception of the scrapings and a superimposed narrower trough 23 is provided to receive the fruit after it is scraped so that it may be delivered to any suitable location, such as a juicer.

The inner surfaces of the cups 20 are roughened in any appropriate manner, as shown at 24, but the inventor does not wish to be limited with respect to the abrading inner surfaces of the cups.

Cup closing members 25 are anchored to the frame members 5 and 6 and, as shown in Fig. 1, the member on the side of the machine facing the reader has its inner end attached to the standard or frame member 5 by fastenings 26, such as screws, rivets or the like, and the outer end thereof has a depending curved portion 27 which is situated in the line of movement of the shaft bearings of the bracket as it is moved upwardly from the position at the bottom of the machine, and the depending curved portion is preferably yieldable to a limited extent and is effective to force the brackets from the positions shown at the bottom of Fig. 2 to the positions shown in the central portion of said figure at a time when a fruit is between the two coacting cups.

In order that fruit may not be dislodged from the delivering trough or chute 28 while the machine is being operated, except when cups are in position to receive the fruit, a curved guard 29 is provided between each of the pairs of cups and each guard may be supported by a post 30 or the like, carried by the member 8.

The belts 21 operate over the pulleys 19 while the cups are in coactive relation to scrape, but are disengaged therefrom where the belt passes over an idler 31 offset with relation to the pulley of the scraper when the scrapers reach the lowermost positions as they are carried in a circle when assembled and operating. The belt also operates over another pulley 32 which is on a driven shaft 33 suitably journaled.

The wheel 8 is, of course, keyed to the shaft 7 and it is driven in any suitable manner, preferably at a low R. P. M., and as this rotation occurs, the shafts of the pairs of cups will be rotated oppositely, as indicated by the arrows in Fig. 2.

I claim:

1. A citrous peel scraper, a frame including horizontally alined bearings, a shaft journalled in said bearings, a cylinder coaxially mounted on said shaft, a series of bearing elements spaced circumferentially around and projecting outwardly from the periphery of said cylinder adjacent each end thereof, the bearing elements adjacent one end of the cylinder being disposed opposite the bearing elements at the other end of the cylinder, arms pivotally supported by said bearing elements to form opposed pairs movable toward and from each other, bearings on the outer ends of said arms, shafts journalled in the last mentioned bearings, driving pulleys fixed on said shafts, confronting scraping cups fixed on said shafts to form citrous fruit receptacles, and means to drive the pulleys at one end of the cylinder in opposite directions to the pulleys at the other end of said cylinder.

2. A citrous peel scraper, a frame including horizontally alined bearings, a shaft journalled in said bearings, a cylinder coaxially mounted on said shaft, a series of bearing elements spaced circumferentially around and projecting outwardly from the periphery of said cylinder adjacent each end thereof, the bearing elements adjacent one end of the cylinder being disposed opposite the bearing elements at the other end of the cylinder, arms pivotally supported by said bearing elements to form opposed pairs movable toward and from each other, bearings on the outer ends of said arms, shafts journalled in the last mentioned bearings, driving pulleys fixed on said shafts, confronting scraping cups fixed on said shafts to form citrous fruit receptacles, belts trained around said pulleys for engagement thereby as the cylinder rotates, and means to drive said belts in opposite directions.

3. A citrous peel scraper, a frame including horizontally alined bearings, a shaft journalled in said bearings, a cylinder coaxially mounted on said shaft, a series of bearing elements spaced circumferentially around and projecting outwardly from the periphery of said cylinder adjacent each end thereof, the bearing elements adjacent one end of the cylinder being disposed opposite the bearing elements at the other end of the cylinder, arms pivotally supported by said bearing elements to form opposed pairs movable toward and from each other, bearings on the outer ends of said arms, shafts journalled in the last mentioned bearings, driving pulleys fixed on said shafts, confronting scraping cups fixed on said shafts to form citrous fruit receptacles, belts trained around said pulleys for engagement thereby as the cylinder rotates, and means to drive said belts in opposite directions, said belts being positioned for disengaging said pulleys at predetermined segments of the paths traversed by the pulleys in moving around said axle.

4. A citrous peel scraper, a frame including horizontally alined bearings, a shaft journalled in said bearings, a cylinder coaxially mounted on said shaft, a series of bearing elements spaced circumferentially around and projecting outwardly from the periphery of said cylinder adjacent each end thereof, the bearing elements adjacent one end of the cylinder being disposed opposite the bearing elements at the other end of the cylinder, arms pivotally supported by said bearing elements to form opposed pairs movable toward and from each other, bearings on the outer ends of said arms, shafts journalled in the last mentioned bearings, driving pulleys fixed on said shafts, confronting scraping cups fixed on said shafts to form citrous fruit receptacles, belts trained around said pulleys for engagement thereby as the cylinder rotates, means to drive said belts in opposite directions, said belts being positioned for disengaging said pulleys at predetermined segments of the paths traversed by the pulleys in moving around said axle, lugs projecting inwardly from said arms, and adjusting screws engaging in said cylinder in the paths of said lugs.

ROBERT D. WEHR.